June 24, 1930. R. F. TAYLOR 1,766,200
TRAP
Filed March 24, 1928 2 Sheets-Sheet 1
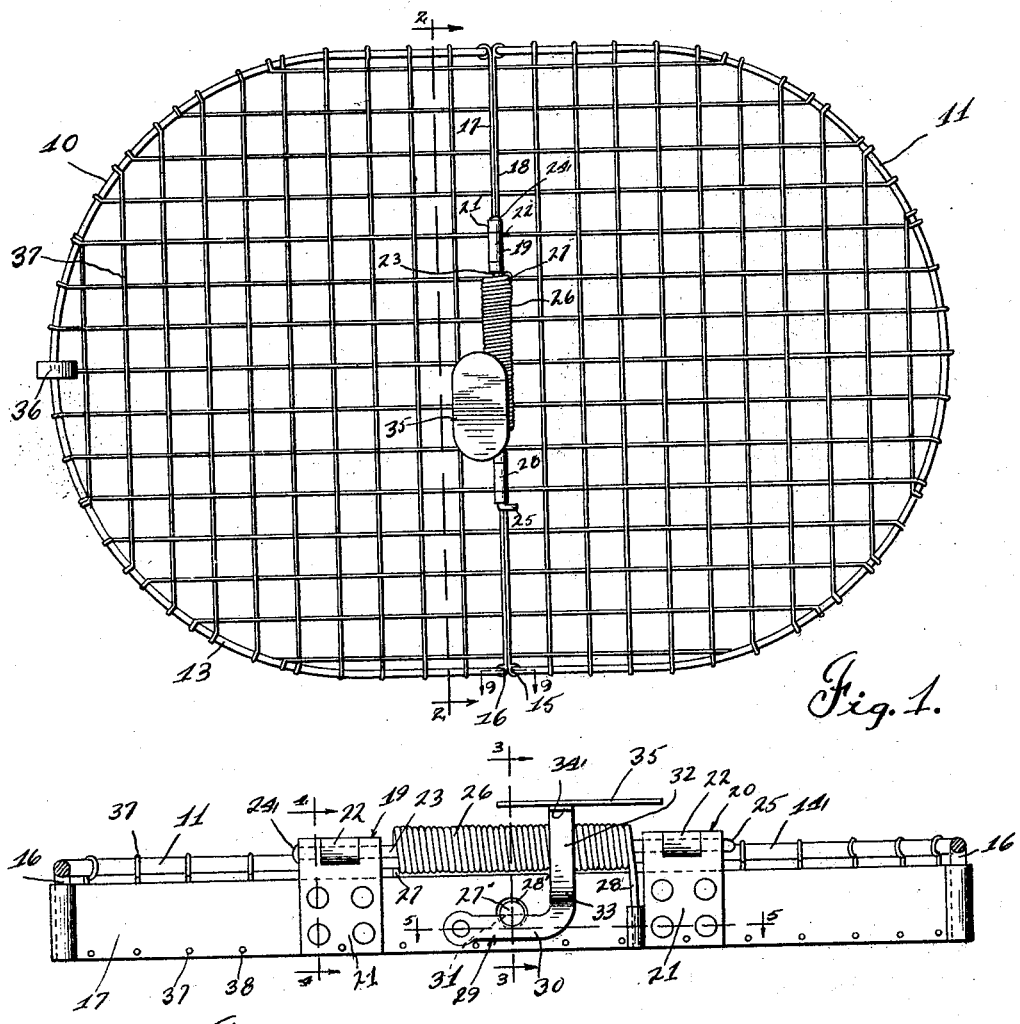
Fig. 1.
Fig. 2.
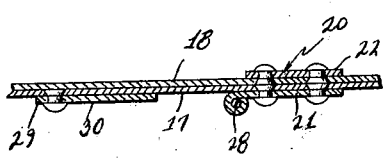
Fig. 5.
Fig. 4.
Inventor
Russell F. Taylor June 24, 1930.  R. F. TAYLOR  1,766,200

TRAP

Filed March 24, 1928    2 Sheets-Sheet 2

Inventor
Russell F. Taylor

By Whittemore Hulbert Whittemore Belknap
Attorneys

Patented June 24, 1930

1,766,200

UNITED STATES PATENT OFFICE

RUSSELL F. TAYLOR, OF SCOTTS, MICHIGAN

TRAP

Application filed March 24, 1928. Serial No. 264,471.

This invention relates to animal traps and has as one of its primary objects to cheapen the cost of manufacture and facilitate assembly by simplifying the construction of the several parts involved and by reducing the number of such parts to a minimum.

Thus many of the advantages and much of the commercial value and acceptability of the invention is attributed to the novel construction of the trap which will be made more apparent as this description proceeds especially when considered in connection with the accompanying drawings wherein:

Figure 1 is a top plan view of the trap showing the same in cocked position;

Figure 2 is a sectional view taken on the plane indicated by the line 2—2 of Figure 1;

Figure 4 is a sectional view taken on the plane indicated by the line 4—4 of Figure 2;

Figure 5 is a sectional view taken on the plane indicated by the line 5—5 of Figure 2;

Figure 3:
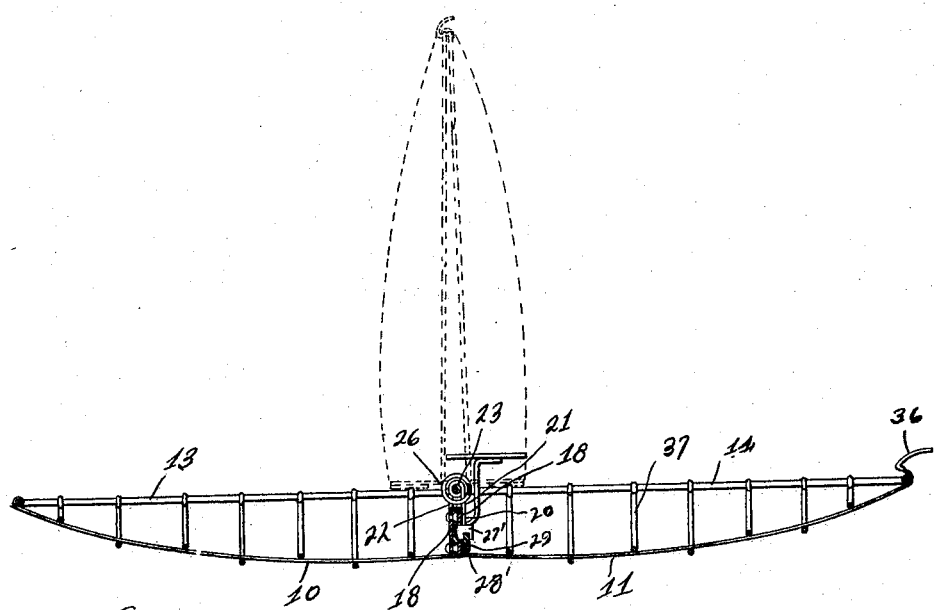
Figure 3 is a sectional view taken on the plane indicated by the line 3—3 of Figure 2.

In general the device comprises a pair of side walls 10 and 11 hingedly connected at the inner ends thereof and having a coil spring normally urging the walls to closed position. A suitable locking device may be placed upon the outer end of one of the walls so that when the trap is sprung, or in other words when the walls are in the position illustrated by the dotted lines in Figure 3 relative movement between the two walls 10 and 11 against the action of the spring will be prevented. Moreover the walls are so constructed that when they are in the closed position heretofore pointed out, they cooperate with one another to form in effect, a cage.

Referring more specifically to the particular construction of trap illustrated herein, it will be noted that the walls 10 and 11 are provided with the frames 13 and 14 respectively. These frames being preferably formed of relatively large wire and for convenience in manufacture are preferably bent to have an arcuate contour substantially as illustrated in the drawings. The inner ends of the frames 13 and 14 terminate in laterally extending portions 15 and 16 respectively which are connected together by means of the strips 17 and 18 respectively. The arrangement being such that when the trap is in the position illustrated by the full lines in Figure 3, the lateral portions 15 and 16 of the frames together with the strips 17 and 18 extend downwardly, the inner surfaces of the strips 17 and 18 being in contacting engagement with each other. For the purpose of hingedly connecting the walls 10 and 11 I provide the hinges 19 and 20, the cooperating parts 21 and 22 thereof being suitably secured to the strips 17 and 18 respectively. The hinge parts 21 and 22 of both hinge members 19 and 20 are preferably pivotally connected by means of a common pivot pin 23 having an enlarged head portion 24 upon one end thereof and terminating at the opposite end in an offset portion 25, the arrangement being to prevent longitudinal movement of the pin relative to the hinge members. Surrounding the pin 23 intermediate the hinge members 19 and 20 is a coil spring 26 having the opposite ends 27 and 28 anchored in any suitable manner to the strips 17 and 18 respectively. With this construction it will be apparent that the spring 26 normally tends to move the walls 10 and 11 of the trap from the position illustrated in the full lines in Figure 3 to the position illustrated in the dotted lines of the same figure. Thus some means must be provided to hold the walls in the position illustrated by the full lines of Figure 3, or in other words for holding the trap in cocked position. For accomplishing this arrangement the strip 18 is provided with a lateral projecting portion 27' adapted, in the open position of the walls 10 and 11, to project through a suitable aperture 28' formed in the strip 17 intermediate the hinge members 19 and 20. Pivoted upon the strip 17 at a point remote from the opening 28' is a suitable L-shaped trigger or lever 29 having a substantially horizontal portion 30 normally extending across a portion of the aperture 28' and adapted to engage a suitable slot 31 formed in the projection 27' adjacent the outer end thereof. The lever 29 is further provided with an upwardly extending portion 32 bowed outwardly as indicated at 33 to clear the spring 26 and preferably terminates in a lateral projection 34. Secured to the lateral projection 34 is a suitable plate 35 constituting the bait receiving portion of the trap.

Referring now to the operation of the device and assuming that the trap is in the position illustrated by the dotted line in Figure 3 and it is desired to set the same, the walls 10 and 11 are merely swung downwardly about the hinge connection aforesaid until they are in the position illustrated by the full lines in Figure 3. In this position of the walls, the strips 17 and 18 are in engagement with each other and the projection 27' upon the strip 17 is extended through the opening 28'. The lever 32 is then swung upwardly about the pivotal connection thereof to the strip 17 until the portion 30 of the lever engages in the slot 31 formed in the projection 27'. When the parts are in the above position the trap is set or cocked and ready for use. Assuming now that a slight downward pressure is transmitted to the bait receiving portion 35, the lever 32 will swing downwardly about the pivotal connection aforesaid releasing the projection 27' from the portion 30 of the lever, thus permitting the spring 26 to instantaneously return the walls 10 and 11 to the dotted line position illustrated in Figure 3. If desired, a suitable catch or latch 36 may be secured to one of the walls as shown in Figures 1 and 3 so that the walls will be automatically latched in closed position.

For the purpose of simplifying the method of manufacture as well as reduce the cost thereof, the walls 10 and 11 are preferably formed of wire screening as indicated generally by the reference character 37, this screening being secured in any suitable manner to the frames 13 and 14 and to the strips 17 and 18. As shown, the ends of the strands adjacent the wire frames 13 and 14 are looped around these frames while the strands adjacent the strips 17 and 18 preferably project through suitable apertures 38 formed in these strips and are looped around the edges of the latter.

Figure 7:
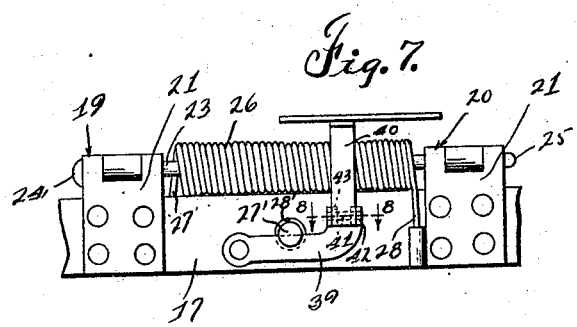
Figure 7 is a detail view showing the position of several parts of the trap in the cocked position thereof.
Figure 6:
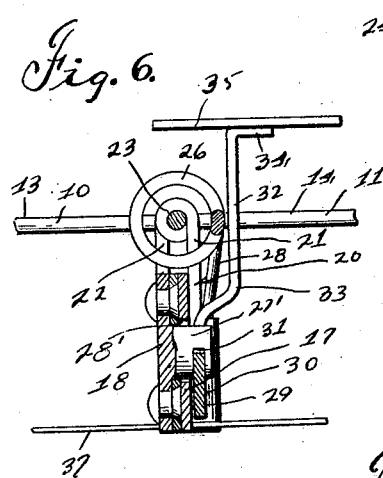
Figure 6 is an enlarged sectional view of the actuating mechanism for the trap.
Figure 8:
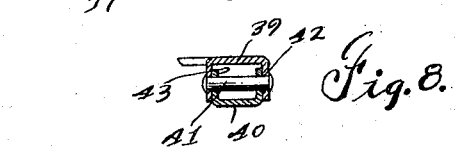
Figure 8 is a sectional view taken on the line 8—8 of Figure 7.
Figure 9:
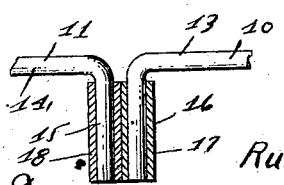
Figure 9 is a sectional view taken on the line 9—9 of Figure 1.

In Figures 7 and 8, I have illustrated a slightly modified form of trigger lever which instead of being formed of one piece of metal is formed of two hingedly connected portions 39 and 40. In other words the pivoted portion 39 for engaging the projection 27' is hingedly connected to the upright portion 40 by means of the pin 41 extending through aligned apertures formed in the ears 42 and 43 projecting laterally from the portions 39 and 40 respectively, the arrangement being such that when the trap is sprung the bait receiving portion carried by the portion 40 of the lever is immediately swung inwardly so as not to interfere with the closing of the trap.

Thus, from the foregoing it will be apparent that the herein described device renders possible the production of a commercially satisfactory construction that is positive in operation and relatively simple and inexpensive to manufacture. Moreover the trap is so designed and constructed that the side walls 10 and 11 will completely enclose the animal without injury thereto.

In view of the obvious changes which may be resorted to without departing from the spirit and scope of this invention, reservation is made to make such changes in the details of the construction as may come within the purview of the accompanying claims.

What I claim as my invention is:

1. A trap including a pair of pivotally connected side wall sections having base portions, means carried by the sections normally urging the latter together to form a cage, a projection carried by one of said base portions and operable in the open position of said sections to project through an aperture formed in the other of said base portions, and a lever pivotally connected to said last mentioned base portion and engageable with the projection aforesaid to hold said sections in open position.

2. A trap including a pair of side wall sections having hingedly connected base portions, means acting upon the base portions normally urging the side wall sections to closed position, a projection carried by one of said base portions and operable in the open position of said section to project through an aperture formed in the other of said base portions, and a lever pivotally connected to the last mentioned base portion and engageable with the said projection to hold the side wall sections in open position, said lever having an upwardly extending projection constituting a bait supporting portion for the trap.

3. A trap including a pair of pivotally connected side wall sections, means normally urging the sections together, and means for latching the trap in cocked position including a member carried by one of the sections and adapted to project through an opening formed in one wall of the other section and a lever pivotally mounted on the latter section and having a portion engageable in a groove formed in said member.

In testimony whereof I affix my signature.

RUSSELL F. TAYLOR.